United States Patent
Gutierrez et al.

(10) Patent No.: US 7,097,044 B2
(45) Date of Patent: Aug. 29, 2006

(54) DRY SEPARATION OF CONTAMINANTS FROM POLYESTER MATERIALS

(75) Inventors: Carlos D. Gutierrez, Spartanburg, SC (US); Alvis Fail, Moore, SC (US)

(73) Assignee: United Resource Recovery Corporation, Spartanburg, SC (US)

( * ) Notice: Subject to any disclaimer, the term of this patent is extended or adjusted under 35 U.S.C. 154(b) by 0 days.

(21) Appl. No.: 10/934,328

(22) Filed: Sep. 3, 2004

(65) Prior Publication Data

US 2005/0054740 A1 Mar. 10, 2005

Related U.S. Application Data

(60) Provisional application No. 60/499,862, filed on Sep. 3, 2003.

(51) Int. Cl.
*B07B 1/20* (2006.01)
*B02C 17/02* (2006.01)

(52) U.S. Cl. .................. 209/305; 209/306

(58) Field of Classification Search ............ 209/21, 209/22, 23, 44.3, 262, 300, 305, 306, 714; 55/471, 473, 428; 241/24.1, 24.8, 24.18, 241/24.28, 24.3, 26
See application file for complete search history.

(56) References Cited

U.S. PATENT DOCUMENTS

| | | | | |
|---|---|---|---|---|
| 3,928,188 A | * | 12/1975 | Link et al. ............ | 209/250 |
| 4,389,020 A | * | 6/1983 | Clin et al. ............ | 241/24.18 |
| 5,344,025 A | * | 9/1994 | Tyler et al. ............ | 209/35 |
| 5,458,246 A | * | 10/1995 | Thom, Jr. ............ | 209/300 |
| 5,958,987 A | | 9/1999 | Schwartz, Jr. et al. | |
| 6,147,129 A | | 11/2000 | Schwartz, Jr. | |
| 6,197,838 B1 | | 3/2001 | Schwartz, Jr. et al. | |
| 6,270,025 B1 | * | 8/2001 | Geigle et al. ............ | 241/3 |
| 6,460,788 B1 | * | 10/2002 | de Feraudy ............ | 241/19 |
| 6,629,653 B1 | * | 10/2003 | Fahrbach et al. ....... | 241/24.21 |
| 2003/0010680 A1 | | 1/2003 | Holmes, III et al. | |
| 2003/0183705 A1 | * | 10/2003 | Christiani et al. ........ | 241/23 |
| 2003/0186159 A1 | | 10/2003 | Schwartz, Jr. | |

FOREIGN PATENT DOCUMENTS

| | | |
|---|---|---|
| DE | 3120792 A1 | 12/1982 |
| DE | 3210972 A1 | 10/1983 |
| DE | 3210973 A1 | 10/1983 |

* cited by examiner

*Primary Examiner*—Joseph C Rodriguez
(74) *Attorney, Agent, or Firm*—Dority & Manning, P.A.

(57) ABSTRACT

A method for separating polyester materials from contaminants is disclosed suitable for, for example, a polyester recycling system. The method is a dry separation method and includes rapidly spinning a mixture of polyester and contaminants within a cleaning chamber. During the spinning of the mixture, the contaminants can be degraded and pass through a screen at the chamber wall while the polyester materials are not substantially degraded and can remain in the cleaning chamber. Polyester fines can also remain in the cleaning chamber. A cleaning device suitable for use in the process is also disclosed. The device can include a screen of a hardened material that can help degrade the contaminants and a plurality of rotating blades that can spin the mixture within the device and can also help to degrade the contaminant materials.

6 Claims, 4 Drawing Sheets

DRY SEPARATION OF CONTAMINANTS FROM POLYESTER MATERIALS

CROSS REFERENCE TO RELATED APPLICATION

This application claims benefit to U.S. Provisional Application having Ser. No. 60/499,862 filed Sep. 3, 2003.

BACKGROUND OF THE INVENTION

Polyesters are polymeric materials made from the esterification of polybasic organic acids with polyhydric acids. Perhaps the most commonly made and used polyester is polyethylene terephthalate (PET), which can be manufactured by reacting terephthalic acid with ethylene glycol.

Polyesters are currently being used in increasing amounts in various applications. For instance, polyesters are commonly used to make many types of beverage and food containers, photographic films, X-ray films, magnetic recording tapes, electrical insulation, surgical aids such as synthetic arteries, fabrics and other textile products.

Because polyesters can be remelted and reformed, ongoing efforts are underway to efficiently recycle as much polyester as possible after use. Before polyester can be recycled, however, it is necessary to separate the post-consumer polyester from contaminants, i.e., materials that may be found mixed with or attached to the polyester. Many recycle processes include a separation step wherein the polyester is washed with an aqueous solution in order to separate the polyester from contaminants. While aqueous washing can remove many contaminants, it does utilize a great deal of water as well as require the further step of post treatment of the wash solution to remove contaminants from the wastewater. Unfortunately, aqueous washing can also prove ineffective for removing relatively hard contaminants, such as glass, sand, and the like, which may become embedded in the polyester materials.

In an attempt to remove embedded materials from polyester substrates, melt filtration processes have been used in which the contaminated polyester is melted and then filtered in order to remove the solid contaminants. These are not terribly cost effective methods, however, and often prove economically unfeasible.

What is needed in the art is a novel method for removing contaminants from polyester materials, and in particular, from post-consumer polyester materials. In addition, what is needed in the art is a polyester recycling process in which contamination levels of treatment water are reduced as compared to previously known recycling processes.

SUMMARY

In one embodiment, the present invention is directed to a process for separating polyester from contaminants. For example, the process can include providing a dry mixture of polyester mixed with contaminant materials to a cleaning chamber and spinning the mixture about the axis of the cleaning chamber so as to fluidize the mixture. As the mixture spins, it can contact the wall of the cleaning chamber. In particular, the contaminants within the mixture can contact the wall. In addition, at least a portion of the wall can be a mesh material, for example a metal screen. As such, when the small contaminant materials contact the wall, they can pass through the mesh material openings, leaving the clean polyester materials within the cleaning chamber.

The cleaning chamber can also include an axle along the central axis that rotates while the mixture spins about the axis. For instance the axle can rotate at a speed of at least about 2000 rpm. In addition, the cleaning chamber can include a plurality of blades emanating from the axle that can rotate with the axle with a tip speed of, for example, greater than about 20 meters per second. In one embodiment, the blades can rotate with a tip speed of greater than 40 meters per second. In another embodiment, the blades can rotate with a tip speed of greater than about 60 meters per second.

The contaminant materials mixed in with the polyester can include loose contaminants as well as materials physically attached to the polyester. For example, contaminants can be adhered to the surface of the polyester materials or embedded within the polyester. The process as herein described can also separate such physically attached contaminant materials from the polyester. Moreover, this can be done without substantially degrading the polyester materials themselves.

The contaminants can also include brittle materials, such as glass, dirt, concrete, and the like. According to this embodiment, the method can also include degrading the brittle contaminants within the cleaning chamber, for example as the contaminants contact the chamber wall and/or the blades.

In one particular embodiment, the contaminants can include glass. For example, glass mixed with and/or embedded in the polyester. According to this embodiment, the process can remove most of the glass from the mixture. For example, the process can remove more than about 97% of the glass from the mixture. In one embodiment, the process can remove more than about 98% of the glass from the mixture.

In one embodiment, the invention is directed to a cleaning vessel suitable for the disclosed process. For example, the cleaning vessel can include a cleaning chamber surrounded by a wall, at least a portion of which can be a hardened mesh material having a hardness about equivalent to or greater than the hardness of grade 316 stainless steel. The cleaning chamber can also include an inlet that can deliver the dry mixture of polyester and contaminants to the chamber.

The cleaning vessel can also include an axle along the central axis and a plurality of blades emanating from the axle. Optionally, the blades can also be formed from a hardened material, for example a material having a hardness about equivalent to or greater than the hardness of grade 400 stainless steel. Moreover, the blades can be oriented on the axle and/or have a cross-sectional shape so as to facilitate airflow through the cleaning chamber when the axle is spinning.

If desired, a portion of the wall of the cleaning chamber can be solid, rather than a mesh. For example, the portion of the wall surrounding the cleaning chamber inlet can be formed of a solid material, for instance a solid hardened steel.

BRIEF DESCRIPTION OF THE FIGURES

A full and enabling disclosure of the present invention, including the best mode thereof, to one of ordinary skill in the art, is set forth more particularly in the remainder of the specification, including reference to the accompanying figures, in which.

Figure 1:
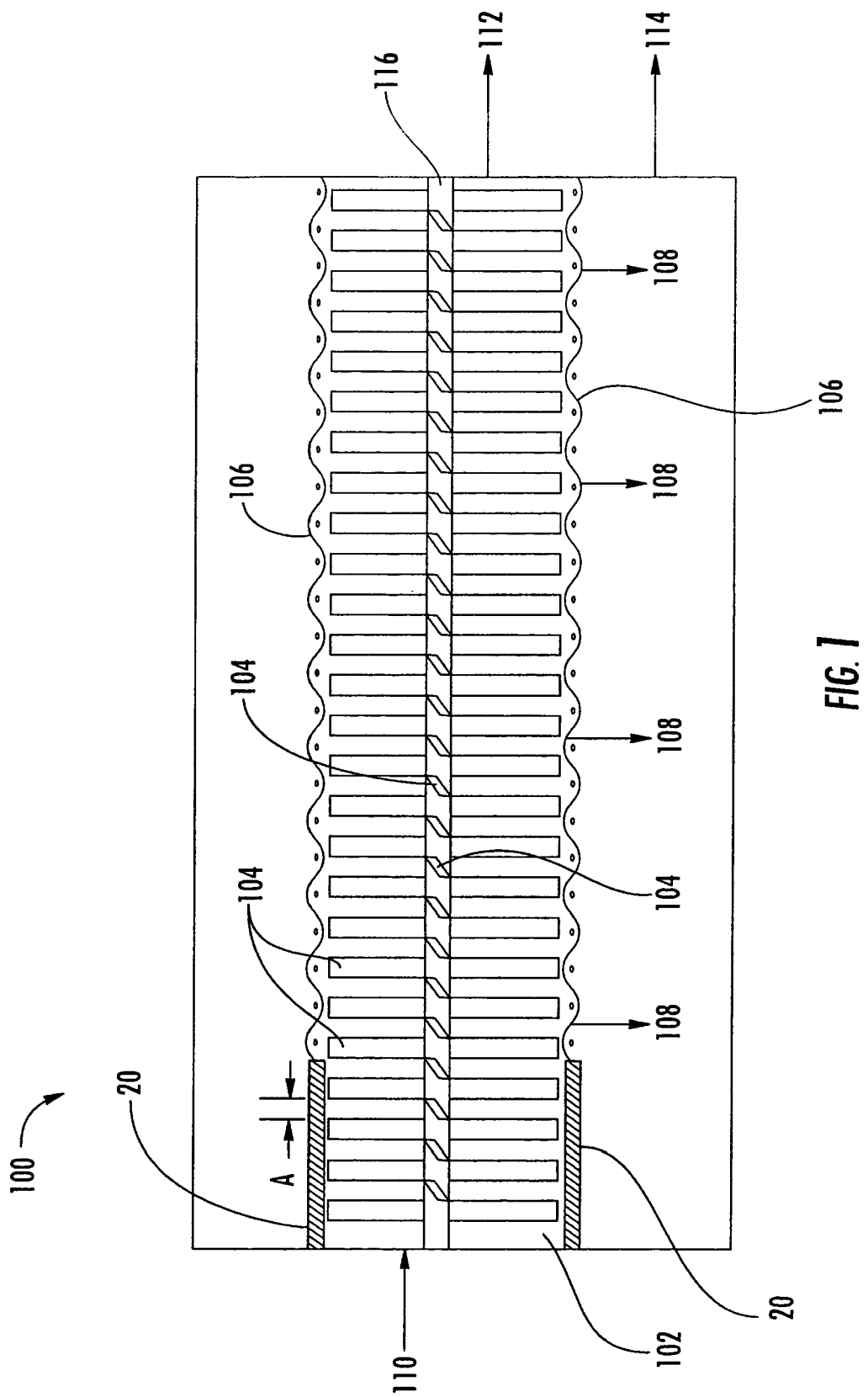
FIG. 1 is a side view of one embodiment of a cleaning vessel of the present invention.

Repeat use of reference characters in the present specification and drawings is intended to represent the same or analogous features or elements of the present invention.

DETAILED DESCRIPTION OF PREFERRED EMBODIMENTS

Reference will now be made in detail to various embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

The present invention is generally directed to a cleaning process for separating and recovering post-consumer polyester from various contaminant materials. The invention is also directed to a cleaning vessel suitable for the disclosed process. The invention can be utilized to separate post-consumer polyester from various contaminants including glass, dirt, paper, metal, and the like. Beneficially, the disclosed process is a dry separation process and can significantly reduce the total production of wastewater as well as the level of contamination of wastewater in a polyester recycling process.

The presently disclosed process includes feeding dry contaminated polyester to a cleaning vessel. The cleaning vessel includes a chamber to which the dry mixture is charged. The chamber is at least partially surrounded by a mesh with a predetermined opening size. Within the chamber can be a series of blades spaced along the axial length of the chamber. During the separation process, the blades can spin at a high rate of speed, fluidizing the dry mixture, and the spinning mixture can contact the chamber wall, which can lead to the degradation of contaminants as well as separation of embedded or otherwise attached contaminants from the polyester. The contaminants can pass through the surrounding mesh, while the polyester can remain in the chamber. Surprisingly, the process can be utilized to separate and degrade contaminants, even embedded contaminants, from the polyester without substantial degradation of the polyester. In addition, while contaminants can be separated from the polyester and pass through the surrounding mesh, the polyester can remain within the cleaning chamber. Even in those embodiments wherein the polyester includes polyester flakes of a size smaller than the mesh openings, the bulk of the small polyester fines can remain in the cleaning chamber and not be lost with the contaminants during the separation process.

As used herein, a polyester is defined as an esterification or reaction product between a polybasic organic acid and a polyol. It is believed that any known polyester or copolyester may be used in the process of the present invention. However, in one particular embodiment, the process of the present invention is directed to a class of polyesters referred to herein as polyol polyterephthalates, in which terephthalic acid serves as the polybasic organic acid.

As used herein, a polybasic organic acid refers to any organic acid having two or more carboxyl groups (—COOH). Most polyesters are derived from dibasic acids, also referred to as dicarboxylic acids. Polybasic acids can have a linear or a cyclic conformation. Examples of linear polybasic acids that can be used to make polyesters include the aliphatic dicarboxylic acids. In particular, the aliphatic dicarboxylic acids having up to ten carbon atoms in their chains can be used. These acids include adipic acid, glutaric acid, succinic acid, malonic acid, oxalic acid, pimelic acid, suberic acid, azelaic acid, sebacic acid, maleic acid, and fumaric acid.

Cyclic polybasic organic acids, on the other hand, include the carbocyclic dicarboxylic acids. These acids include phthalic acid, isophthalic acid, and terephthalic acid. In particular, terephthalic acid is used to make polyethylene terephthalate, which is perhaps the most common commercially available polyester.

As described above, a polybasic organic acid can be reacted with a polyol to produce a polyester. Polyols are compounds that contain at least two hydroxyl groups. Many polyesters are synthesized with a diol. Diols are normally prepared from an alkene by the net addition of two hydroxy groups to the double carbon bond in a method known as hydroxylation. Polyols are commonly referred to as glycols and polyhydric alcohols. Examples of polyols used to make polyesters include ethylene glycol, propylene glycol, butylene glycol, and cyclohexane dimethanol.

For exemplary purposes, Table 1 contains a nonexhaustive list of commercially available polyesters that may be recovered and recycled according to the present invention. For each polyester, the corresponding polybasic organic acid and polyol are provided.

TABLE 1

| POLYESTER | POLYBASIC ORGANIC ACID | DIOL |
| --- | --- | --- |
| Polyethylene Terephthalate | Terephthalic Acid | Ethylene Glycol |
| Polybutylene Terephthalate | Terephthalic Acid | Butylene Glycol |
| PETG Co-polyester | Terephthalic Acid | Cyclohexane-dimethanol And Ethylene Glycol |
| PBTG Co-polyester | Terephthalic Acid | Cyclohexane-dimethanol And Butylene Glycol |
| Polycyclohexane-dimethanol Terephthalate | Terephthalic Acid | Cyclohexane-dimethanol |
| PEN Polyester | Naphthalene Dicarboxylic Acid | Ethylene Glycol |

In one embodiment, the present invention is directed to a cleaning process for separating and recovering post-consumer polyester from various contaminant materials. For example, the process can be utilized for removing loose contaminants that may be merely mixed in with the polyester, such as loose dirt, paper, glass or sand particles for instance, from a mixture of materials charged to the cleaning vessel. In addition, the disclosed process can remove coatings adhered to polyester. For example, labels attached to a polyester substrate can be physically separated from the polyester according to the present invention. In addition, the process can be advantageously utilized for separating contaminants from the polyester that are embedded in the softer polyester substrate, such as glass, dirt, and metal contaminants, for example. Once these attached materials have been physically separated from the polyester, they can be removed from the mixture according the process, leaving the clean polyester without the contaminants.

Prior to being charged to the cleaning vessel, the contaminated polyester materials can be, if desired, chopped or ground into flake form. For purposes of this disclosure, the term polyester flake refers to polyester materials that have been chopped or ground into small pieces. Flaking of the materials can be done for the purpose of facilitating handling. It should be understood that all different sizes and shapes of material may be used in the process of the present invention and no one size or shape is required. In general, however, the majority of the individual polyester pieces charged to the cleaning vessel can be larger than the openings of the mesh material in the cleaning vessel, to facilitate handling of the mixture. Sizing of the materials prior to charging the materials to the cleaning vessel can also help to insure that the contaminants are of a size to pass through the mesh, although many contaminants can be degraded within the cleaning vessel during the process prior to passing through the mesh.

According to the present invention, a mixture of materials including polyester can be charged to a cleaning vessel. In particular, the mixture of materials charged to the cleaning vessel will contain at least some post-consumer polyester and the mixture will be dry. That is, the mixture will not be in a slurry form. The dry mixture of materials need not be excessively dry, however. For example, the mixture need not be pre-treated to remove all moisture from the mixture, and the mixture can be charged to the vessel at an atmospheric level of humidity.

FIG. 1 illustrates one embodiment of a cleaning vessel 100 suitable for the process of the present invention. A dry mixture including polyester materials and contaminant materials can be charged to vessel 100 at inlet 110. For instance, the mixture of materials can be charged to vessel 100 via a gravity feed, a screw feeder, or any other suitable feed method. The mixture of materials can include contaminants that are physically attached to polyester materials as well as contaminants that are merely mixed with the polyester, and not necessarily physically attached to the polyester. For example, the mixture charged to the vessel 100 can include some combination of polyester materials attached to various coatings, such as paper or other labels; polyester materials embedded with contaminants, such as dirt and glass; polyester materials that do not have contaminants physically attached; as well as loose contaminants, such as dirt, metals and loose paper, which are merely mixed in with the polyester materials.

Referring to FIG. 1, the mixture of materials can be charged to one end of chamber 102 within vessel 100 via inlet 110. In this particular embodiment, chamber 102 can have a circular cross-section, as can be more clearly seen in FIG. 2. In addition, chamber 102 can generally have a length to diameter ratio L/D of at least about 2, though this is not a requirement of the invention. For example, the diameter of chamber 102 can generally be between about 0.5 and about 3 meters.

Chamber 102 can include a series of blades 104 radially extending from an axle 116 that runs along the axis of chamber 102. In one embodiment, individual blades 104 can be oriented and/or shaped so as to control airflow over the blades. For example, each individual blade 104 can be set at a slight angle to axle 116 and/or have a specifically designed cross-sectional shape so as to facilitate air flow through the chamber as shown by the directional arrows at 110 and 112 when the axle is spinning.

Figure 2:
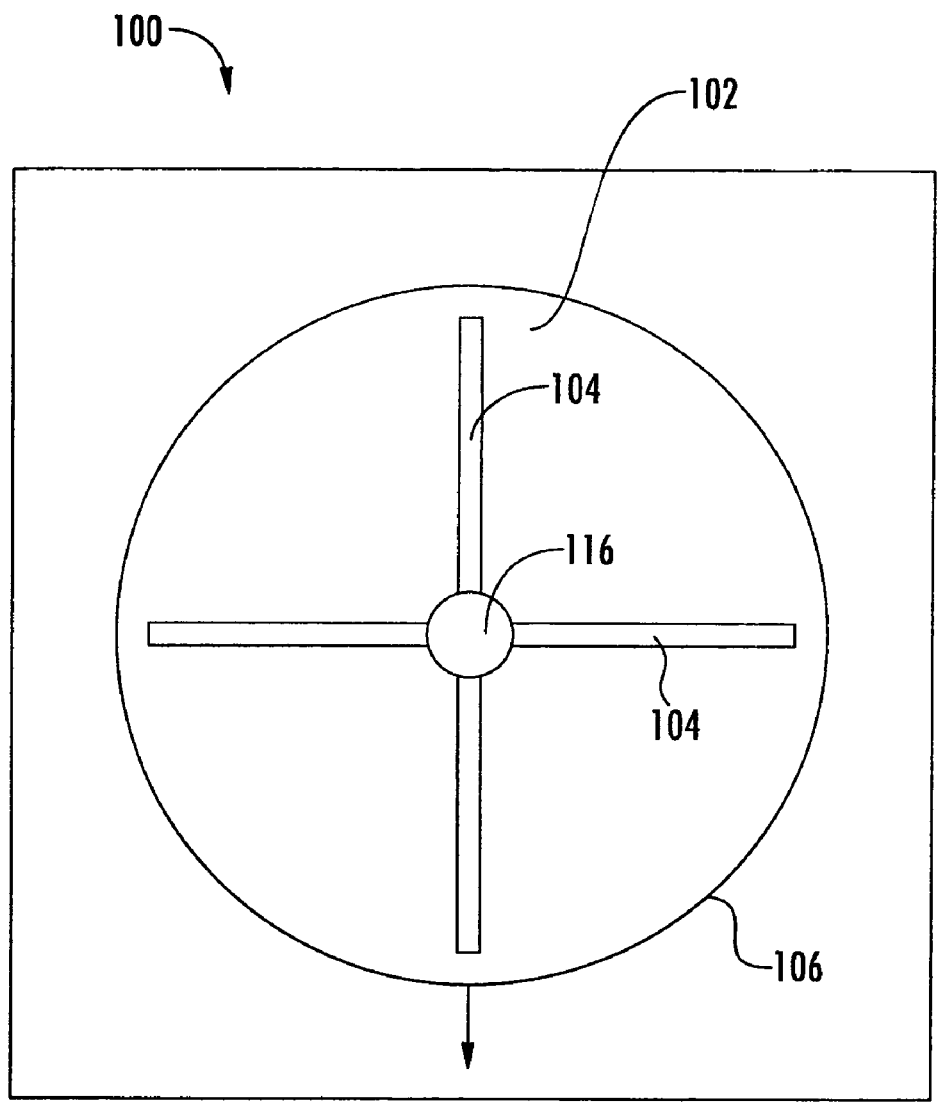
FIG. 2 is a cut-away front view of the cleaning vessel of FIG. 1.

According to this embodiment, and as can be seen in FIGS. 1 and 2, multiple blades 104 can be aligned along axle 116 to form one or more rows of blades extending along the axial length of the chamber 102. Adjacent individual blades 104 within a row can be separated from one another by a distance A. In this embodiment, the distance A can be roughly equivalent to the width of a blade on the axle. In another embodiment, the blades need not be axially aligned with one another to form rows, and can be more randomly located around axle 116 than is illustrated in the Figures.

The blades 104 can also extend from axle 116 so as to be offset from each other around the circumference of the axle 116. For example, and as shown in FIG. 2, rows of blades 104 can extend from axle 116 with a 90° angle between adjacent rows. This particular arrangement of the rows of blades 104 is not a requirement of the present invention, however. For instance, in another embodiment, rows of blades 104 can extend from axle 116 with an angle between rows of more or less than that shown in FIG. 2. For example, in one embodiment, two or three rows of blades could be equidistantly spaced around axle 116. In another embodiment, more than four rows of blades could be spaced around axle 116, for instance, five, six, or even more rows could be spaced around the central axle 116.

In one embodiment, the individual blades 104 can be formed of a relatively hard material in order to prevent uneconomically fast degradation of the blades 104 during the process. For example, in one embodiment, the individual blades can be formed of a hardened steel such as a hardened stainless or carbon steel. For instance, the blades can be formed of a 400 or higher-grade stainless steel. The blades can optionally be formed of other hard materials as well, having a roughly equivalent or greater hardness. For example, in other embodiments, the blades can be formed of abrasion resistant steel or the like.

After being charged to the vessel 100, the materials can be induced to rotate or spin about axle 116, for instance, by the rotation of blades 104. As previously mentioned, in one embodiment, the rotation of blades 104 can also facilitate airflow through the chamber and the movement of the materials from one end of the chamber 102 to the other.

The blades 104 can rotate at a high rate of speed and promote fluidization of the mixture, i.e., the suspension as well as the rotation of the materials within the chamber 102. For example, blades 104 can rotate at a speed greater than about 20 m/sec. In one embodiment, the blades can rotate at greater than about 2000 rpm. In one embodiment, the tip speed of blades 104 can be between about 40 m/sec and about 100 m/sec such as about 50 m/sec. In another embodiment, the tip speed of blades 104 can be between about 60 m/sec and about 80 m/sec.

In one embodiment, axle 116 can be rotating as the materials are fed to chamber 102. According to this embodiment, the initial motion of the materials upon entrance to chamber 102 can be radial, rather than rotational. As such, it may be preferred in some embodiments of the invention that the wall 20 surrounding chamber 102 near the inlet 110 of the chamber 102 be a solid material, to prevent degradation of the wall of chamber 102 by the initial radial motion of the materials. For example, in one embodiment, between about 5% and about 20% of the initial length of chamber 102 can be surrounded by a solid wall 20, as shown in FIG. 1.

In addition, in one embodiment of the invention, the solid wall 20 of chamber 102 can be formed of a relatively hard material, so as to further prevent degradation of the wall by the initial radial motion of the materials.

After being charged to chamber 102 and while under the influence of the spinning blades 104, the dry mixture containing polyester and contaminants can begin to rotate about axle 116. Moreover, due to the high rotational speed of the blades, the materials can become suspended in the chamber as they rotate about axle 116. In addition, the materials can be continually abraded by the spinning blades as well as by collision with each other and the wall 20, 106 of chamber 102 as they rotate about axle 116.

As the materials are abraded within chamber 102, contaminants that are attached to the polyester substrate can become separated from the substrate. In addition, materials that are embedded in the polyester substrate can be stripped from the materials. Surprisingly, while the present process can promote separation of contaminants from polyester, including embedded materials, as well as degradation of many contaminants, the polyester itself is not substantially degraded by the process. For example, while coating materials, such as paper label materials or vapor barrier coatings, and embedded materials, such as embedded glass and dirt, can become detached from the polyester substrate through the disclosed process, the polyester flakes themselves will remain essentially the same size and shape as originally charged to the vessel 100.

The lack of degradation of the polyester flakes during the cleaning process appears to be independent of blade speed as well as independent of the mesh size of wall 106 that at least partially surrounds chamber 102. For instance, there appears to be little or no degradation of the polyester in the process no matter whether the blade speed is relatively slow, or somewhat higher.

In contrast to the polyester materials, brittle and fibrous contaminant materials mixed in with the mixture, whether charged to the vessel 100 already physically separated from the polyester or physically separated from the polyester within chamber 102, can be degraded by the process. For example, glass, dirt, concrete, brittle polymer or metal materials, and the like, can be degraded by the process. In addition, fibrous materials, such as paper, can also be degraded by the process.

At least a portion of the wall 106 of chamber 102 can be a mesh material. For purposes of this disclosure, a mesh is herein defined as a material defining multiple open spaces in a network. For example, a mesh can include any openwork fabric or net structure and can include a net, a screen, a sieve, and the like.

For example, in the embodiment illustrated in FIG. 1, the entire chamber 102 beyond the initial section surrounded by wall 20 can be surrounded by wall 106 that is formed of a mesh material. In order to promote degradation of the contaminants contained in the mixture, as well as to prevent excessively fast deterioration of wall 106, wall 106 can be formed of a hardened material. For example, wall 106 can be formed of a hardened stainless or carbon steel screen. In one embodiment, wall 106 can be formed of a grade 316 or higher stainless steel screen or a material of similar or greater hardness.

Wall 106 can generally have a predetermined mesh size. In particular, the mesh size of wall 106 can be of a size such that the majority of the polyester substrate pieces in the mixture are larger than the openings in the mesh wall 106. For example, in one embodiment, wall 106 can be a metal screen and can have a market grade mesh size of between about 8 and about 12.

As the contaminants are degraded within the chamber 102, they can become smaller than the openings in wall 106 and can pass out of chamber 102 as represented by arrows 108 in FIG. 1, leaving the cleaner polyester substrate in the chamber 102.

The presently disclosed process can be particularly effective at removing glass from a mixture including both glass and polyester. Glass can be one of the most difficult materials to separate from post-consumer polyester during a polyester recycling process and can be detrimental to the process if not completely removed. Glass that is not removed during the recycling process can not only cause serious damage to processing equipment during the recycling process, but it can also destroy the materials to be formed from the recycled polyester. For example, glass that is not removed during the recycling process can become incorporated with the polyester during a subsequent material formation process (e.g., a beverage container formation process) and can destroy the materials to be formed from the polyester through, for instance, the formation of holes in the polyester products.

According to one embodiment of the present process, more than about 97% of the glass in a mixture containing both glass and polyester can be removed from the mixture. In one embodiment, more than about 98% of the glass in a mixture can be removed. In another embodiment, more than about 99% of the glass can be removed.

Surprisingly, while brittle contaminant materials such as glass can be degraded and pass through the mesh of 106, the polyester materials themselves can remain in the chamber 102. This is partly due to the fact that the polyester is not degraded within the chamber 102 during the process, as discussed above. However, it has been discovered that even polyester flakes of a smaller size than the mesh openings can remain in chamber 102 during the cleaning process of the present invention. In particular, it has been discovered that polyester fines can remain in the chamber during the process. While not wishing to be bound by any particular theory, it is believed that due to the high rotational speed of the mixture in chamber 102, the materials within the chamber can become fluidized and suspended as they rotate about axle 116. Moreover, it is believed that the centrifugal forces acting on the suspension can cause the materials within the mixture to separate, with the denser materials, and in particular, contaminants such as glass, metal, paper, and the like, moving to the outside of the mass and passing through the wall 106 (following any degradation due to abrasion), while the lighter polyester materials, and particularly the small polyester fines, can remain suspended closer to the center of the chamber. In particular, glass-like materials and fibrous materials can pass through the screen, while elastomeric materials, such as PET will remain behind. Even PET particles smaller than the screen orifice will remain with the main body of the PET. As the polyester fines remain in the center of the suspended, rotating mass of material, very few polyester fines will pass through the screen in the process, and high yield of polyester can be attained in the cleaning process of the present invention.

Following the separation process, the clean polyester materials can be removed from chamber 102. For example, the residence time of the materials in the chamber can be, in one embodiment, between about 0.5 and about 3 seconds. For example, FIG. 1 illustrates a continuous process in which the polyester materials can be removed from chamber 102 at access 112, while the separated contaminants can be removed from vessel 100 at a separate access, such as at 114 following the disclosed separation process.

Figure 3:
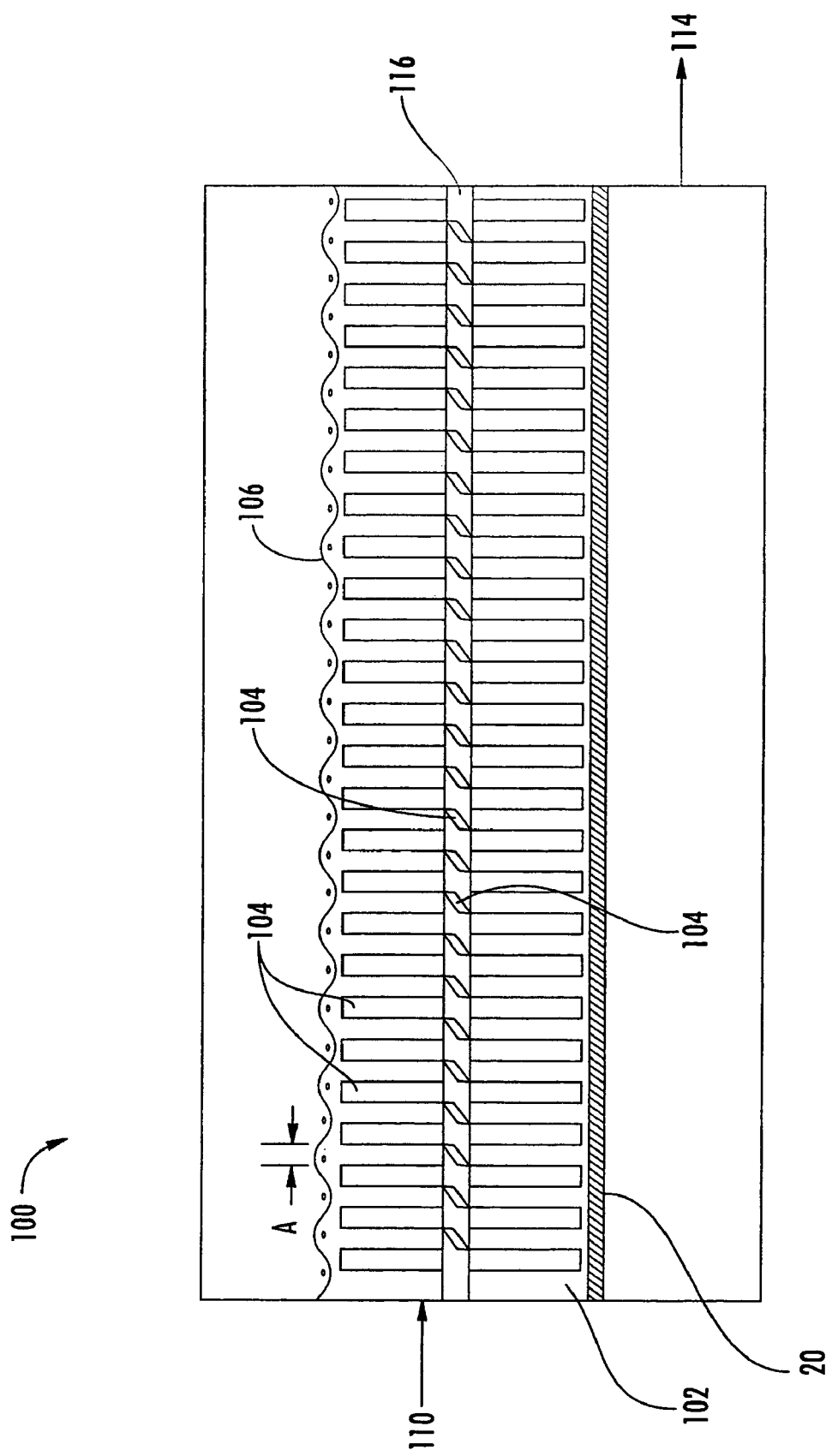
FIG. 3 is another embodiment of a cleaning vessel of the present invention.

In an alternative embodiment, for example in a batch process, the chamber can include only a single access for both introducing and removing the polyester materials. In addition, when considering a batch process, it may be preferable to have the base of the chamber include a solid wall across the entire length of the chamber. For instance, in one embodiment illustrated in FIG. 3, the chamber 102 can include a solid wall 20 along the base of the entire length of chamber 102 and a mesh wall 106 above the solid wall 20 along the entire length of the chamber. Such an embodiment may be preferred, for example, in a batch process that includes charging the dry mixture of materials to the chamber prior to the initiation of rotation of the mixture, in order to prevent polyester substrate from falling through the screen when the mixture is not spinning.

Beneficially, the presently disclosed cleaning process is a dry process. As such, contaminants can be separated from the polyester during the process without the utilization of wash water, which can reduce the overall costs of the cleaning process.

Moreover, even if aqueous processing of the polyester occurs following the disclosed dry cleaning process, there can be much lower contamination levels and hence less wastewater treatment processing required by the process. For example, following the above described dry cleaning process, the polyester substrate may be subjected to an aqueous rinse, if desired, to remove any remaining impurities. For example, the polyester flakes can be subjected to a subsequent water rinse under agitation. As many contaminant materials and impurities can be removed by the above described dry cleaning process, problems encountered in the past with aqueous separation techniques, such as congealing of separated coating materials, or expensive water treatment requirements, for example, can be less of a problem in the polyester recovery process of the present invention. For example, following the dry cleaning process of the present invention, wash water can generally show a decrease in chemical oxygen demand of at least about 15% that can vary (depending on the tip speed of the blades used), as compared to wash water used directly on the contaminated polyester materials. Similarly, through use of the process of the present invention prior to an aqueous wash, the total dissolved solids level of the wash water can decrease by about 30%, total suspended solids can decrease by at least about 50%, and oil and grease can decrease by about 15%, in various embodiments.

The disclosed process may optionally be utilized in conjunction with other polyester recycling treatment processes, as are generally known in the art. For example, the disclosed dry cleaning process can be utilized in conjunction with polyester treatment processes such as those disclosed in U.S. Pat. No. 5,958,987 to Schwartz, Jr., et al., U.S. Pat. No. 6,197,838 to Schwartz, Jr., et al., U.S. Pat. No. 6,147,129, to Schwartz. Jr., or U.S. Patent Application Publication No. 2003/0010680 to Holmes, et al., all of which are incorporated herein by reference.

The present invention may be better understood with reference to the following examples.

EXAMPLE 1

US polyester flakes were cleaned in a dry cleaning vessel according to the present invention. As a control, 620.5 g of the US flake polyester was cleaned according to a standard aqueous wash process without being subjected to the dry cleaning process of the present invention. Roughly equivalent amounts of the U.S. flake were cleaned according to the present invention and then washed in a like manner as the control following the dry cleaning process. Two samples of US flake were dry cleaned according to the present invention with the tip speed of the cleaning vessel blades at either 40 m/s (620.2 g sample) or 60 m/s (620.7 g sample). Comparison results for the wash water were as follows:

Chemical Oxygen Demand:

|  | COD (ppm) | COD/g flake | % reduction |
|---|---|---|---|
| CONTROL | 634 | 1.02 |  |
| 40 M/S | 520 | 0.84 | 17.9 |
| 60 M/S | 422 | 0.68 | 33.5 |

Total Dissolved Solids:

|  | TDS (ppm) | TDS/g flake | % reduction |
|---|---|---|---|
| CONTROL | 312 | 0.50 |  |
| 40 M/S | 197 | 0.32 | 36.8 |
| 60 M/S | 151 | 0.24 | 51.6 |

Total Suspended Solids:

|  | TSS ppm | TSS/g flake | % reduction |
|---|---|---|---|
| CONTROL | 756 | 1.22 |  |
| 40 M/S | 343 | 0.55 | 54.6 |
| 60 M/S | 140 | 0.23 | 81.5 |

Oil and Grease:

|  | O&G ppm | O&G/g flake | % reduction |
|---|---|---|---|
| CONTROL | 53 | 0.09 |  |
| 40 M/S | 32 | 0.05 | 39.6 |
| 60 M/S | 19 | 0.03 | 64.2 |

Nitrates:

|  | TOTAL ppm |
|---|---|
| CONTROL | 2 |
| 40 M/S | 2 |
| 60 M/S | 2 |

Nitrogen:

|  | TOTAL ppm |
|---|---|
| CONTROL | 9.2 |
| 40 M/S | 8.3 |
| 60 M/S | 7 |

Phosphorous:

|  | TOTAL ppm |
|---|---|
| CONTROL | 7.1 |
| 40 M/S | 5.8 |
| 60 M/S | 4.3 |

Figure 4:
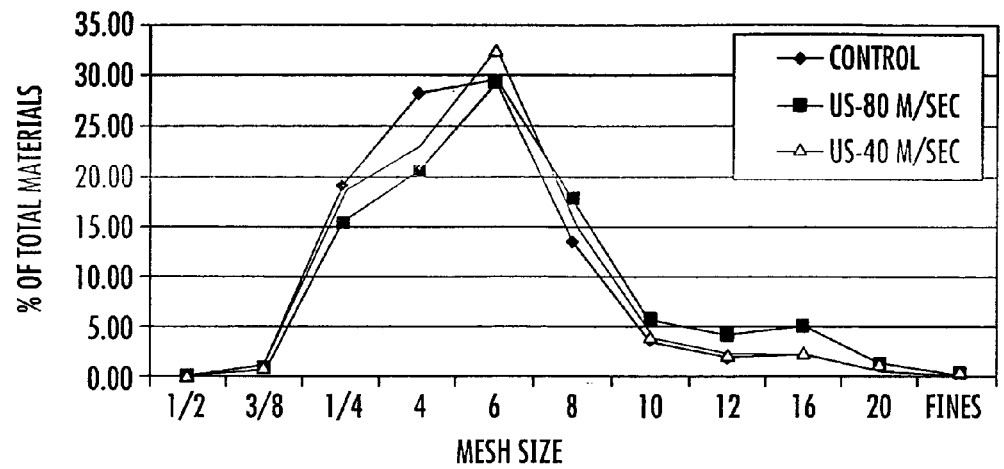
FIG. 4 shows the particle size distribution of US polyester flakes dry cleaned according to the present invention as compared to similar flakes cleaned according to a traditional aqueous wash process.

FIG. 4 shows the particle size distribution of the materials cleaned as described above. As can be seen, the particle size distribution of the materials cleaned according to the present invention did not change appreciably from that cleaned only according to the wash process. That is, the particle size distribution of all of the cleaned materials remained about the same irrespective of the different cleaning processes, indicating that the polyester flakes are not appreciably degraded in the disclosed process.

Tabular results showing the percentage of the clean polyester materials of a size above the given mesh size for the control and the samples cleaned according to the disclosed process are given in Table 2, below:

TABLE 2

|  | Mesh Size | |
|---|---|---|
|  | 12 | 16 |
| Control | 4.93% | 2.98% |
| 40 M/S | 5.20% | 2.82% |
| 80 M/S | 10.75% | 6.64% |

As can be seen, the polyester fines were not lost with the removal of the contaminants during the disclosed process.

In addition, it was determined that approximately 4.66% by weight of the total material charged to the dry cleaning apparatus was removed as contaminants during the process when the process was operated at a blade speed of 80 m/s, and approximately 2.65% by weight of the total material charged to the dry cleaning apparatus was removed as contaminants by the cleaning process when the process was operated at a blade speed of 40 m/s.

EXAMPLE 2

Mexican polyester flakes were cleaned in a dry cleaning vessel according to the present invention. As a control, 621.2 g of the Mexican flake polyester was cleaned according to a standard aqueous wash process without being subjected to the dry cleaning process of the present invention. Samples of roughly equivalent amounts of the Mexican flake were cleaned according to the present invention and then washed in a like manner as the control following the dry cleaning process. Two samples of the Mexican flake were dry cleaned according to the present invention with the tip speed of the cleaning vessel blades at either 40 m/s (620.4 g sample) or 60 m/s (620.4 g sample).

Comparison results for the wash water was as follows:

Chemical Oxygen Demand:

|  | COD ppm | COD/g flake | % reduction |
|---|---|---|---|
| CONTROL | 663 | 1.07 |  |
| 40 M/S | 238 | 0.38 | 64.1 |
| 60 M/S | 159 | 0.26 | 76.0 |

Total Dissolved Solids:

|  | TDS ppm | TDS/g flake | % reduction |
|---|---|---|---|
| CONTROL | 354 | 0.57 |  |
| 40 M/S | 169 | 0.27 | 52.2 |
| 60 M/S | 481 | 0.78 | −36.1 | a. Note:
The sample utilized to obtain the TDS figure for the 60 m/s sample was believed to have been contaminated, as the results are nonsensical.

Total Suspended Solids:

|  | TSS ppm | TSS/g flake | % reduction |
|---|---|---|---|
| CONTROL | 829 | 1.33 |  |
| 40 M/S | 269 | 0.43 | 67.5 |
| 60 M/S | 93 | 0.15 | 88.8 |

Oil and Grease:

|  | O&G ppm | O&G/g flake | % reduction |
|---|---|---|---|
| CONTROL | 22 | 0.04 |  |
| 40 M/S | 18 | 0.03 | 18.1 |
| 60 M/S | 6 | 0.01 | 72.7 |

Nitrates:

|  | TOTAL ppm |
|---|---|
| CONTROL | 2 |
| 40 M/S | 2 |
| 60 M/S | 2 |

Nitrogen:

|  | TOTAL ppm |
|---|---|
| CONTROL | 22.5 |
| 40 M/S | 13.8 |
| 60 M/S | 9 |

Phosphorous:

|  | TOTAL ppm |
|---|---|
| CONTROL | 3.8 |
| 40 M/S | 3.7 |
| 60 M/S | 1.9 |

Figure 5:
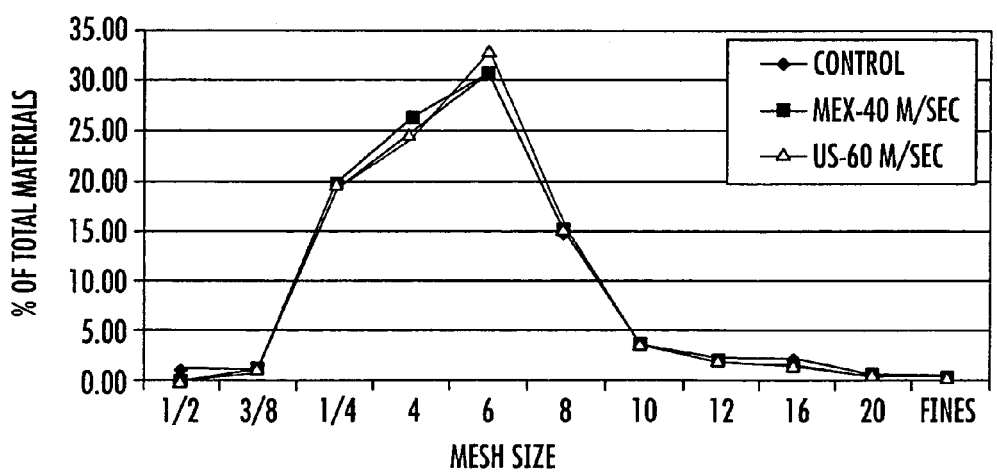
FIG. 5 shows the particle size distribution of Mexican polyester flakes cleaned according to the present invention as compared to similar flakes cleaned according to a traditional aqueous wash process.

FIG. 5 shows the particle size distribution of the materials cleaned as described above. As can be seen, the particle size distribution of the materials cleaned according to the present invention did not change appreciably from that cleaned only according to the wash process. That is, the particle size distribution of all of the cleaned materials remained about the same irrespective of the different cleaning processes, indicating that the polyester flakes are not appreciably degraded in the disclosed process.

Tabular results showing the percentage of the clean polyester materials of a size above the given mesh size for the control and the samples cleaned according to the disclosed process are given in Table 3 below:

TABLE 3

|         | Mesh Size | |
|---------|-------|-------|
|         | 12    | 16    |
| Control | 5.74% | 3.44% |
| 40 M/S  | 3.54% | 1.71% |
| 60 M/S  | 3.54% | 1.65% |

In addition, it was estimated that approximately 7.8% by weight of the total material charged to the dry cleaning apparatus was removed as contaminants by the cleaning process when the process was operated at a blade speed of 60 m/s, and approximately 5.12% by weight of the total material charged to the dry cleaning apparatus was removed as contaminants by the cleaning process when the process was operated at a blade speed of 40 m/s.

EXAMPLE 3

Mixtures of glass and polyester were treated according to the present invention. Three mixtures were dry cleaned as described above at different blade speeds: 55 m/sec, 61 m/sec, and 67 m/sec. Initial mixture glass composition and separation process results are tabulated in Table 4, below:

TABLE 4

| Blade Speed | Initial Glass Amt (g) | Final Glass Amt (g) | Removal % |
|---|---|---|---|
| 55 m/sec | 897.10 | 19.366 | 97.8% |
| 61 m/sec | 836.96 | 15.536 | 98.1% |
| 67 m/sec | 895.88 | 9.128 | 99.0% |

These and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention.

What is claimed is:

1. A method for separating polyester from brittle contaminants comprising:
   providing a dry mixture comprising polyester and brittle contaminant materials to a cleaning chamber, the cleaning chamber comprising an axle on a longitudinal axis of the cleaning chamber and a plurality of blades emanating from the axle;
   rotating the axle at a speed of greater than 2000 rpm such that the mixture revolves about the axis;
   contacting a wall of the cleaning chamber with at least a portion of the brittle contaminant materials as the mixture revolves about the axis of the cleaning chamber, wherein at least a portion of the wall comprises a metal screen;
   degrading the brittle contaminant materials within the cleaning chamber; and
   passing at least a portion of the brittle contaminant materials through the metal screen.

2. The method according to claim 1, wherein the mixture includes at least a portion of the brittle contaminant materials embedded within the polyester.

3. The method according to claim 1, wherein the brittle contaminant materials comprise glass.

4. The method according to claim 1, wherein more than about 97% of the brittle contaminant materials in the mixture pass through the metal screen.

5. The method according to claim 1, wherein more than about 98% of the brittle contaminant materials in the mixture pass through the metal screen.

6. The method according to claim 1, in which the metal screen is a hardened stainless screen or a carbon steel screen such that the metal screen does not exhibit excessive deterioration during the process.

* * * * *